Patented Feb. 23, 1937

2,071,333

UNITED STATES PATENT OFFICE 2,071,333

MANUFACTURE OF ORGANIC ESTERS OF CELLULOSE

Camille Dreyfus, New York, N. Y., and Herbert E. Martin, Cumberland, Md., assignors to Celanese Corporation of America, a corporation of Delaware No Drawing. Application December 5, 1933, Serial No. 701,049

5 Claims. (Cl. 260—102)

This invention relates to the process of preparing organic esters of cellulose and relates more particularly to the treatment of organic esters of cellulose after their formation to render them more stable for forming into solutions for the production of films, filaments, lacquers, plastic masses, etc.

An object of the invention is to prepare organic esters of cellulose in an expeditious manner. Another object of the invention is the production of organic esters of cellulose of improved properties such as greater stability, non-corrosiveness, better spinning properties and capability of producing filaments or other products of increased strength, etc. Other objects of the invention will appear from the following detailed description.

In the process of preparing organic esters of cellulose, the esterification of the cellulose is usually formed by treating the cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid, whereupon usually after the addition of a certain quantity of water, the cellulose ester is permitted to hydrolyze or ripen to develop the desired solubility characteristics. Water and/or other non-solvent for the cellulose ester may then be added in sufficient amounts to precipitate the cellulose ester from solution. The cellulose ester is then washed to free it of acids as much as possible.

Thus in preparing cellulose acetate, cellulose is acetylated by treatment with acetic anhydride and a catalyst, such as sulphuric acid, in the presence of a large amount of glacial acetic acid as a solvent for the cellulose acetate that is formed. After completion of the acetylation, the resulting solution of cellulose acetate in glacial acetic acid is ripened and then treated with a large excess of water or other non-solvent to precipitate the cellulose acetate. After precipitation the cellulose actate may be washed with water to remove as much acid and other ingredients of the acetylation mixture as possible.

The cellulose ester so formed contains sulfur in the form of various compounds which impair the stability of the cellulose ester and impart thereto the tendency of decomposing and discoloring.

By the method of this invention the cellulose esters are made more stable, non-corrosive and are given enhanced spinning properties. In place of, or as an addition to washings and treatments with water to remove acids, sulphur compounds, etc., the cellulose esters are treated with steam for the same purposes. The treatment with steam however is much more effective than the prior treatments and also produces unexplainable actions that improve the spinning qualities of the cellulose esters.

By employing this invention the cellulose ester may be washed with steam rather than with water, whereby by one operation the stability of the cellulose ester and also the removal of acid diluent and solvent are effected. When treating cellulose esters according to this invention, the effect of the treatment extends to the interior of the lumps, thoroughly and equally stabilizing and purging the entire mass and preventing the common source of trouble caused by former methods of washing and stabilizing the outer layers of the lumps more thoroughly than the centres of the lumps. The treatment with steam makes the cellulose esters porous, delustered and swollen whilst hot water makes it plastic; thus the steam treatment more readily penetrates to all parts of the mass cleansing and stabilizing it throughout, whilst by the old methods it was very difficult to wash out or reach impurities in the plastic mass or centres of the lumps.

The cellulose ester may be washed, stabilized and dried in one operation. To dry the cellulose ester all that is necessary is to end the treatment with dry steam or a mixture of steam and dry air that may or may not be followed by a blast of dry air.

Cellulose esters prepared according to this invention show an enormous improvement in spinning stability and ability to be spun into filaments of low denier. These cellulose esters also have excellent filtration properties; that is to say, their solutions do not clog the filtering media as readily as solutions of cellulose esters that have not been subjected to the steam treatment. Thus steam stabilized cellulose acetate gives a very good drawdown in spinning in comparison with regular material. The usual analytical data on the cellulose acetate does not show why this should be. The viscosity and acetyl value of the treated cellulose acetate are practically normal, but its spinning stability is appreciably better and its sulphur content considerably lower than those of cellulose acetate obtained by the previous methods.

The stabilizing with steam permits the treatment to be carried out while at rest. Thus it is possible expeditiously to form quickly soluble cellulose acetate, the precipitated fibre of which is so tender that it will not stand up to the vigorous thrashing imparted to it by the mechanical stirrers and washers required in the treatment of a commercial size batch by the liquid method.

Cellulose esters prepared according to this invention have a high heat test, (that is, they may be heated to a relatively high temperature without decomposing or charring), a high clarity, a low ash, a good color and a good viscosity. By treating with steam there is avoided any troubles that might arise from the prior methods caused by hardness of water or other contamination of water and liquids that cause off color and low heat tests.

Filaments and yarns formed from cellulose acetate prepared according to this invention have greater strength than those prepared by former methods. They also exhibit more uniform properties between various batches. The uniformity of product permits of more easily mixing into the large spinning batches the smaller formed batches as the balancing of the various characters and properties is almost unnecessary. This uniformity of product also permits of less thorough mixing of the small batches into the large batch as the properties of the small batches are nearly uniform and do not require the blending made necessary by batches of widely differing characteristics.

The yarn and fabric made from filaments formed from cellulose acetate prepared according to this invention are dyed evenly and to the same extent, by nonwater soluble and water soluble dyes, as the same type of materials prepared from liquid treated cellulose acetate.

According to our invention we treat organic esters of cellulose with steam for the purpose of stabilizing, washing and drying or for the purpose of performing any one of these functions. This steam treatment is preferably given to the cellulose ester immediately after ripening and precipitation from the esterification solution.

Our invention may be employed in the making of any suitable organic ester of cellulose such as cellulose acetate, cellulose formate, cellulose propionate and cellulose butyrate. Cellulose in any suitable form such as cotton, cotton linters, wood pulp either sulphite or soda pulp, reconstituted cellulose, etc., may be employed in making the cellulose esters. This cellulose may be activated by pretreatment with lower aliphatic acids or by treatment with alkali, etc. The esterifying agent may be acetic anhydride, formic acid, propionic anhydride, or butyric anhydride, depending upon the ester of cellulose to be formed. The esterification may be carried out in the presence of a suitable catalyst such as sulphuric acid, zinc chloride, sodium bisulphate, methyl sulphate. While we prefer to employ acetic acid as the diluent or solvent for the cellulose esters to be formed, any other suitable organic acid may be employed such as propionic acid and butyric acid.

The cellulose ester may first be hydrolyzed or ripened by the addition of a suitable quantity of water to the primary solution resulting from the esterifying process and permitting the same to stand at suitable temperatures for such time until the cellulose ester develops the desired solubility characteristics, prior to distillation or precipitation and draining and/or distillation to recover a part or all of the organic acid employed as a solvent or diluent in the esterification process.

It is preferable to neutralize any catalyst employed prior to the precipitation of the cellulose ester from the esterification mixture. Thus where a catalyst, such as sulphuric acid that has a strong degrading action on cellulose compounds is employed in the esterifying process, it may be neutralized by the addition of an alkali or alkaline salt, such as the carbonate or bicarbonate of sodium, potassium or ammonium salt of the organic acid employed as diluent or solvent.

The cellulose ester precipitated from the esterifying solution may be washed with water and then stabilized by a treatment with steam. In place of washing with water, which requires several baths or long continued spraying at various temperatures, the washing may be done by treatment with steam preferably a wet steam. After steaming to stabilize (and wash if steam is used as the washing medium) the cellulose ester may be dried by applying dry steam or steam mixed with hot air or by steam followed by hot air. It is preferable to employ steam in all three steps to avoid the hazards of contaminated water, the plasticizing action of water and unevenness of treatment by failure of the water to readily penetrate evenly to all parts of the mass.

Prior to washing and/or stabilizing with steam the cellulose ester may be subjected to a shredding action. As the steam has substantially no plasticizing action, the precipitated cellulose ester may be shredded in the wet stage in place of the customary grinding while dry after stabilization and drying.

The treatment with steam may be carried out at any suitable temperatures and at any suitable pressures ranging from super-atmospheric pressure, through atmospheric pressure to sub-atmospheric pressure. However it is preferred to employ slight pressures sufficient to carry the steam after passing through the mass off to a condensing line or to the atmosphere without the aid of pumps. The temperature of the steam may be from 100° C. to 145° C. depending upon the type of cellulose ester being treated and the duration of the treatment. For the purpose of washing the cellulose ester, a damp steam of near 100° C. is preferable and the treatment although not necessary may be continued for many hours without injury to the cellulose ester. For stabilizing cellulose acetate treatments of from 1¼ to 5 hours at from 100° C. to 115° C. are preferable. If metallic chlorides are used as the esterification catalyst, the time of treatment of the cellulose ester is shorter than the time of treatment required of a cellulose ester prepared in the presence of a sulphur compound as the catalyst.

Any type of device which permits of steam passing through the mass of cellulose ester may be employed for carrying out this invention. Thus in treating the cellulose ester by a batch method there may be used a cylinder having a steam distributing means at the bottom thereof over which rests a perforated plate upon which the cellulose ester rests. The cylinder may be open at the top or closed for the purpose of collecting and directing the spent steam. This invention is also applicable to continuous processes in which the cellulose ester is carried by a conveyer and the steam is circulated through the cellulose ester in a direction counter current to the direction of travel of the conveyer.

It will be seen that by our process, the cellulose ester has greatly improved properities in many respects. Moreover the washing, stabilizing and drying may be reduced to one step thus eliminating many hazards that tend to mar uniformity of product.

In order further to illustrate our invention but without being limited thereto, the following specific examples are given.

*Example I*

Cellulose acetate is prepared by acetylating cellulose with a mixture comprising acetic anhydride, acetic acid and sulfuric acid as catalyst. The primary solution of cellulose acetate so formed is hydrolyzed or ripened to form an acetone soluble cellulose acetate after which water is added to the solution to precipitate the cellulose acetate.

Charges of the precipitated cellulose acetate are washed free of acid by spraying with water. The charges are treated with steam for 5¼ hours at 112° C. This treatment results in a cellulose acetate having substantially the same acetyl value as that prepared by treating by the prior method, it has however a reduced content of sulfur compounds, corresponding, for example, to .02% $SO_4$ as compared with .15% in blanks treated according to the prior method. The resulting cellulose acetate has all the desirable properties above described.

*Example II*

Example I is repeated except that hot dry air at 112° C. is mixed with the steam during the last quarter of an hour of the treatment. The cellulose acetate produced is the same in properties as in Example I.

*Example III*

Charges of precipitated ripened cellulose acetate are drained of excess liquid. These charges are then subjected to a treatment with steam at 110° C. for 5½ hours starting with low pressure steam and ending with dry air mixed with the steam. The charges are washed free from acid and have the above referred to improved properties.

*Example IV*

Charges of precipitated ripened cellulose acetate in which there is a trace of residual $H_2SO_4$ are treated with steam at 110° C. for 2½ hours. The presence of the acid speeds up the stabilization of the cellulose ester. Thus when the material is washed completely before steaming, the stabilization by steaming proceeds only slowly, giving a product analyzing 0.06% $SO_4$ after about 4 hours treatment. When, however, the material is taken before washing with water and steamed in that condition the same $SO_4$ content is obtained in 2½ hours.

In the all described process with the application of steam to the ripened cellulose ester there is produced an improved cellulose ester that has a high stability towards treatment with water boiling at super-atmospheric pressure, may be heated to high temperatures, before it chars or becomes off color, and does not decompose on standing.

The cellulose ester produced or treated in accordance with this invention may be used for all purposes to which such esters are put, such as the making of artificial yarns, filaments, bristles or straws, films, foils, plastic masses, molding compositions, lacquers, coating compositions and the like.

Having described the invention, what we desire to secure by Letters Patent is:

1. The process of stabilizing organic acid esters of cellulose containing sulfur compounds that impart thereto a tendency to decompose and discolor, which comprises treating the same with an atmosphere of uncontaminated water vapor at temperatures and for periods of time sufficient to remove substantially such sulfur compounds but insufficient to cause substantial hydrolysis of the organic acid ester of cellulose.

2. The process of stabilizing cellulose acetate containing sulfur compounds that impart thereto a tendency to decompose and discolor, which comprises treating the same with an atmosphere of uncontaminated water vapor at temperatures and for periods of time sufficient to remove substantially such sulfur compounds but insufficient to cause substantial hydrolysis of the cellulose acetate.

3. The process of stabilizing cellulose acetate containing sulfur compounds that impart thereto a tendency to decompose and discolor, which comprises treating the same with an atmosphere of uncontaminated water vapor and air at temperatures and for periods of time sufficient to remove substantially such sulfur compounds but insufficient to cause substantial hydrolysis of the cellulose acetate.

4. Organic acid esters of cellulose of improved stability which have been prepared by treating an organic acid ester of cellulose containing sulfur compounds that impart thereto a tendency to decompose and discolor, which comprises treating the same with an atmosphere of uncontaminated water vapor at temperatures and for periods of time sufficient to remove substantially such sulfur compounds but insufficient to cause substantial hydrolysis of the organic acid ester of cellulose.

5. Cellulose acetate of improved stability which has been prepared by treating cellulose acetate containing sulfur compounds that impart thereto a tendency to decompose and discolor, which comprises treating the same with an atmosphere of uncontaminated water vapor at temperatures and for periods of time sufficient to remove substantially such sulfur compounds but insufficient to cause substantial hydrolysis of the cellulose acetate.

CAMILLE DREYFUS.
HERBERT E. MARTIN.